Figure 1:
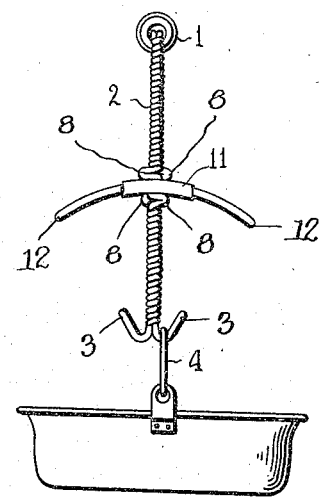

E. A. SCHOON.
LIFTING DEVICE.
APPLICATION FILED FEB. 4, 1915.

1,176,781.

Patented Mar. 28, 1916.

Witnesses
Anna M. Dorr.
Chas. W. Stauffiger

Inventor
Egon A. Schoon

By Barthel & Barthel
Attorneys

UNITED STATES PATENT OFFICE.

EGON A. SCHOON, OF DETROIT, MICHIGAN.

LIFTING DEVICE.

1,176,781. Specification of Letters Patent. Patented Mar. 28, 1916.

Application filed February 4, 1915. Serial No. 6,023.

*To all whom it may concern:*

Be it known that I, EGON A. SCHOON, a subject of the Emperor of Austria-Hungary, residing at Detroit, in the county of Wayne and State of Michigan, have invented certain new and useful Improvements in Lifting Devices, of which the following is a specification, reference being had therein to the accompanying drawings.

This invention relates to a lifting device for the bail or handle of cooking utensils and similar vessels, and the primary object of my invention is to provide a simple and inexpensive lifting device that has a novel guard, shield or canopy adapted to protect the hand gripping the device and prevent the hand from being scalded, burned or otherwise injured during the manipulation of a utensil, a part thereof or a lid.

Another object of this invention is to provide a strong and durable culinary implement that permits of pots and lids thereof being safely moved, the implement being constructed principally of wire bent to support a guard or steam deflector in proximity to the handle of the implement to shield the hand gripping the same.

I attain the above and other objects by a mechanical construction that will be hereinafter specifically described and then claimed, and reference will now be had to the drawing, wherein there are illustrated the preferred embodiments of my invention, but it is to be understood that the structural elements are susceptible to such changes in the size, shape and manner of assemblage, as fall within the scope of the appended claim.

Figure 2:
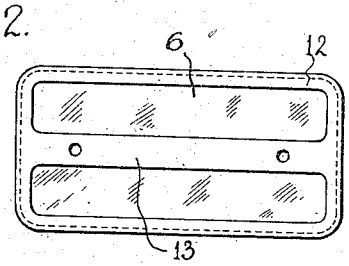

In the drawings, Figure 1 is an end view of the lifting device; and Fig. 2 is a plan of a guard frame.

The drawing shows a conventional form of tubular handle 1, through which extends a bail 2 composed of two twisted wires that have the lower ends thereof bent to form oppositely disposed hangers or hooks 3 by which the bail 4 of a pot or other utensil is gripped. Two of the hangers or hooks 3 are used when lifting a utensil, but one hanger or hook can be used, particularly when lifting a lid.

The arrangement of the wires of the bail provides arms and intermediate the ends of the arms or in proximity to the handle 1, the wires of each arm are bent to provide oppositely directed offset portions 8 that coöperate in holding a guard in engagement with the device. The guard is convexo-concave and is in the form of a metallic frame 12 bent to embrace the marginal edges of a sheet of isinglass 6. Centrally of the frame are metallic strips 13 which are longitudinally disposed and apertured in conjunction with the sheet of isinglass 6 to receive the wires of the bail. The metallic strips 13 prevent the offset portions 8 of the bail from cutting or breaking the sheet of isinglass 6 and the offset portions 8 support the guard whereby it will deflect steam or warm matter from the tubular handle 1, thereby preventing a hand gripping a handle from being scalded or burned. The sheet of isinglass 6 constitutes a shield of insulation material and it is practically impossible for the upper portion of the bail to become overheated to that extent as to injure the tubular handle 1 or burn a hand contacting with the bail. In some instances, a single piece of material 11 may be used to form top and bottom strips of the guard frame.

What I claim is:—

A lifting device comprising a bail having straight arms each formed of two twisted wires terminating in opposed hooks, each wire being bent to form oppositely directed separated offset portions, with the offset portions at one end of said bail in horizontal planes with the offset portions at the opposite end of said bail, a handle on said bail, and a convexo-concave guard having the ends thereof supported between the offset portions of each arm of said bail.

In testimony whereof I affix my signature in presence of two witnesses.

EGON A. SCHOON.

Witnesses:
ANNA M. DORR,
CHAS. W. STAUFFIGER.

Copies of this patent may be obtained for five cents each, by addressing the "Commissioner of Patents, Washington, D. C."